United States Patent
Marshall, IV et al.

(10) Patent No.: US 10,486,099 B2
(45) Date of Patent: Nov. 26, 2019

(54) SYSTEMS AND METHODS FOR CLOSED LOOP DEHYDRATION OF A MERCURY REMOVAL UNIT

(71) Applicant: Chevron U.S.A. Inc., San Ramon, CA (US)

(72) Inventors: Robert E. Marshall, IV, Houston, TX (US); Saham Sam Tafreshi, Humble, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 154 days.

(21) Appl. No.: 15/856,259

(22) Filed: Dec. 28, 2017

(65) Prior Publication Data
US 2019/0201834 A1 Jul. 4, 2019

(51) Int. Cl.
*B01D 53/02* (2006.01)
*B01D 53/04* (2006.01)
*B01D 53/26* (2006.01)

(52) U.S. Cl.
CPC ..... *B01D 53/0438* (2013.01); *B01D 53/0423* (2013.01); *B01D 53/261* (2013.01); *B01D 53/265* (2013.01); *B01D 2253/116* (2013.01); *B01D 2257/602* (2013.01); *B01D 2257/80* (2013.01); *B01D 2259/4009* (2013.01)

(58) Field of Classification Search
CPC ........ B01D 2253/116; B01D 2256/245; B01D 2257/602; B01D 2257/80; B01D 2259/4009; B01D 2259/402; B01D 53/0423; B01D 53/0438; B01D 53/261; B01D 53/265

See application file for complete search history.

(56) References Cited

U.S. PATENT DOCUMENTS

| | | | | | |
|---|---|---|---|---|---|
| 4,874,525 | A | * | 10/1989 | Markovs | B01D 15/00 210/673 |
| 5,281,259 | A | * | 1/1994 | Markovs | B01D 53/002 423/210 |
| 2016/0145518 | A1 | * | 5/2016 | Clark | C10L 3/106 95/114 |

OTHER PUBLICATIONS

U.S. Appl. No. 15/407,561, filed Jan. 17, 2017, First Named Applicant: Chevron U.S.A. Inc.

* cited by examiner

*Primary Examiner* — Christopher P Jones
(74) *Attorney, Agent, or Firm* — Karen R. DiDomenicis

(57) ABSTRACT

Saturated mercury adsorbent in a gas mercury removal unit is dehydrated in a LNG, LPG or cryogenic gas plant using a regeneration gas stream. Spent regeneration gas stream is then condensed and the water is removed therefrom to form a renewed regeneration gas stream in a closed loop. The regeneration gas stream is compressed and recycled to a location in the plant upstream of an acid gas removal unit or upstream of a regeneration gas dehydration unit such that the regeneration gas stream is not sent to a flare. Conventional plants can be retrofitted to achieve improved process efficiencies, cost savings and environmental benefits.

6 Claims, 3 Drawing Sheets

SYSTEMS AND METHODS FOR CLOSED LOOP DEHYDRATION OF A MERCURY REMOVAL UNIT

FIELD

The present disclosure relates to the field of mercury removal units that utilize adsorption beds to remove mercury from gas, and further relates to systems and methods for dehydrating the adsorption beds in such mercury removal units. The gas is then subjected to cryogenic cooling to form liquefied gas.

BACKGROUND

Mercury removal units utilizing adsorption beds are used in cryogenic gas plants, such as natural gas liquids (NGL) recovery and liquified natural gas (LNG) production plants, to remove mercury from a feed gas, e.g., natural gas. Mercury must be removed to prevent damage to aluminum heat exchangers. Mercury removal beds are dehydrated using hot, dry gas, which can be sourced from nitrogen or process gas downstream of a molecular sieve dehydration unit in the cryogenic gas plant, in which water is adsorbed onto molecular sieve material. The hot, dry gas flows through the mercury removal bed to desorb water from the mercury adsorbent material. The spent, wet gas from the mercury removal bed is typically sent to flare, rather than being recovered. This results in significant costs associated with unrecovered nitrogen or process gas, as well as undesirable environmental impacts and potential financial penalties associated with flaring.

It would be desirable to have a process for dehydrating mercury removal beds resulting in cost savings and reduced environmental impact.

SUMMARY

In one aspect, a system is provided for dehydrating a mercury removal unit in a plant to produce liquefied natural gas, liquefied petroleum gas, and/or cryogenic gas. The system includes a mercury removal vessel containing mercury adsorbing material for adsorbing mercury from a feed gas stream contacting the mercury adsorbing material, thereby forming a mercury depleted gas stream to be further processed in the plant. The mercury removal vessel in dehydration mode has a dry gas inlet and a wet gas outlet, and the mercury removal vessel in adsorption mode has a feed gas inlet and a mercury depleted gas outlet. A condenser is in communication with the wet gas outlet of the mercury removal vessel in dehydration mode for condensing water to form a stream containing water and regeneration gas. A separator is provided for separating the water and the regeneration gas from the stream containing water and gas thereby forming a water stream and a regeneration gas stream. A compressor is provided for compressing the regeneration gas stream. A conduit is provided for passing the regeneration gas stream from the compressor to a location in the plant upstream of an acid gas removal unit or upstream of a regeneration gas dehydration vessel such that the regeneration gas stream is not sent to flare.

In one aspect, a method is provided for method for dehydrating a mercury removal unit in a plant to produce liquefied natural gas, liquefied petroleum gas, and/or cryogenic gas. The method includes contacting the mercury adsorbing material with a regeneration gas stream thereby desorbing water from the mercury adsorbing material within the mercury removal vessel in dehydration mode to form a spent regeneration gas stream. The spent regeneration gas stream is condensed in a condenser to form a stream containing water and gas. The water and the gas from the stream are separated thereby forming a water stream and a regeneration gas stream. The regeneration gas stream is compressed in a compressor. Finally, the regeneration gas stream is recycled from the compressor to a location in the plant upstream of an acid gas removal unit or upstream of a regeneration gas dehydration vessel such that the regeneration gas stream is not sent to flare.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Figure 1:
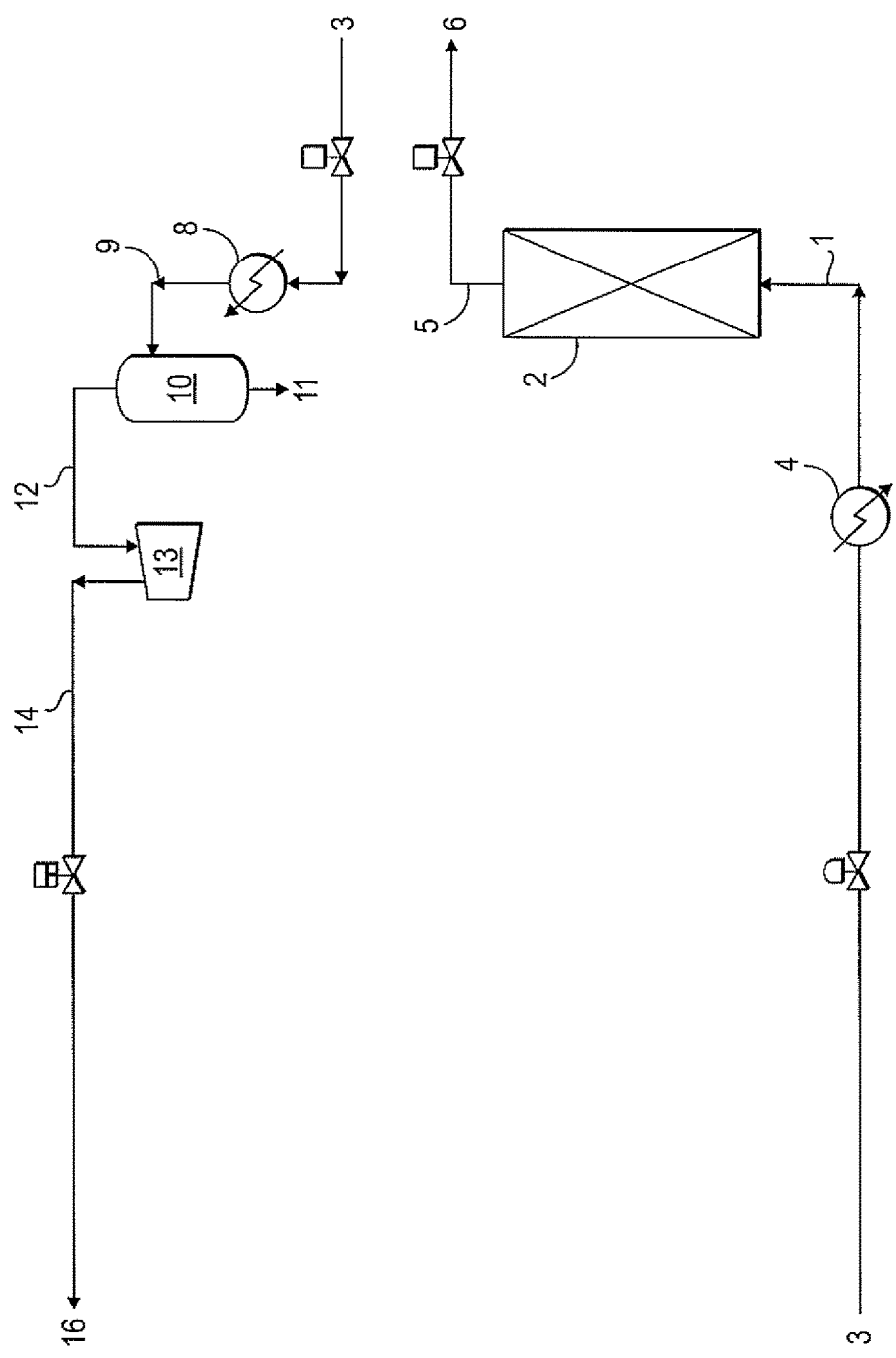
FIG. 1 is a simplified schematic diagram illustrating a process including a mercury removal unit according to the prior art.

Referring to FIG. 1, shown is a simplified schematic diagram illustrating a process including a mercury removal bed 2 in dehydration mode according to the prior art. Mercury removal adsorbent material in bed 2 is dehydrated using dry gas 1, which is sourced from a regeneration gas source 3 which can be nitrogen or process gas downstream of the plant's primary dehydration unit (not shown). The dry gas is heated at heater 4 with temperature control to maintain safe operating margin within the allowable limits of the mercury removal adsorbent material. The hot, dry gas 1 then flows through the mercury removal bed to desorb water from the adsorbent material. After passing through the mercury removal bed 2 and desorbing water, the spent, wet gas 5 is typically sent to the flare 6. This results in significant costs associated with unrecovered nitrogen or process gas, and undesirable environmental impacts associated with flaring. Also shown is a flow path of regeneration gas from the plant's primary dehydration unit (not shown), coming from the same regeneration gas source 3 described above. In condenser 8, regeneration gas is condensed to form a stream 9 containing water and gas. The water and the gas from the stream are separated in a separator 10 thereby forming a water stream 11 and a regeneration gas stream 12. The regeneration gas stream 12 is compressed in a compressor 13. The compressed regeneration gas stream 14 is sent to a location 16 in the plant upstream of the plant's primary dehydration unit (not shown). The primary dehydration unit, also referred to as the main dehydration unit, includes at least two adsorbent (molecular sieve) bed containing vessels arranged in parallel.

Figure 2:
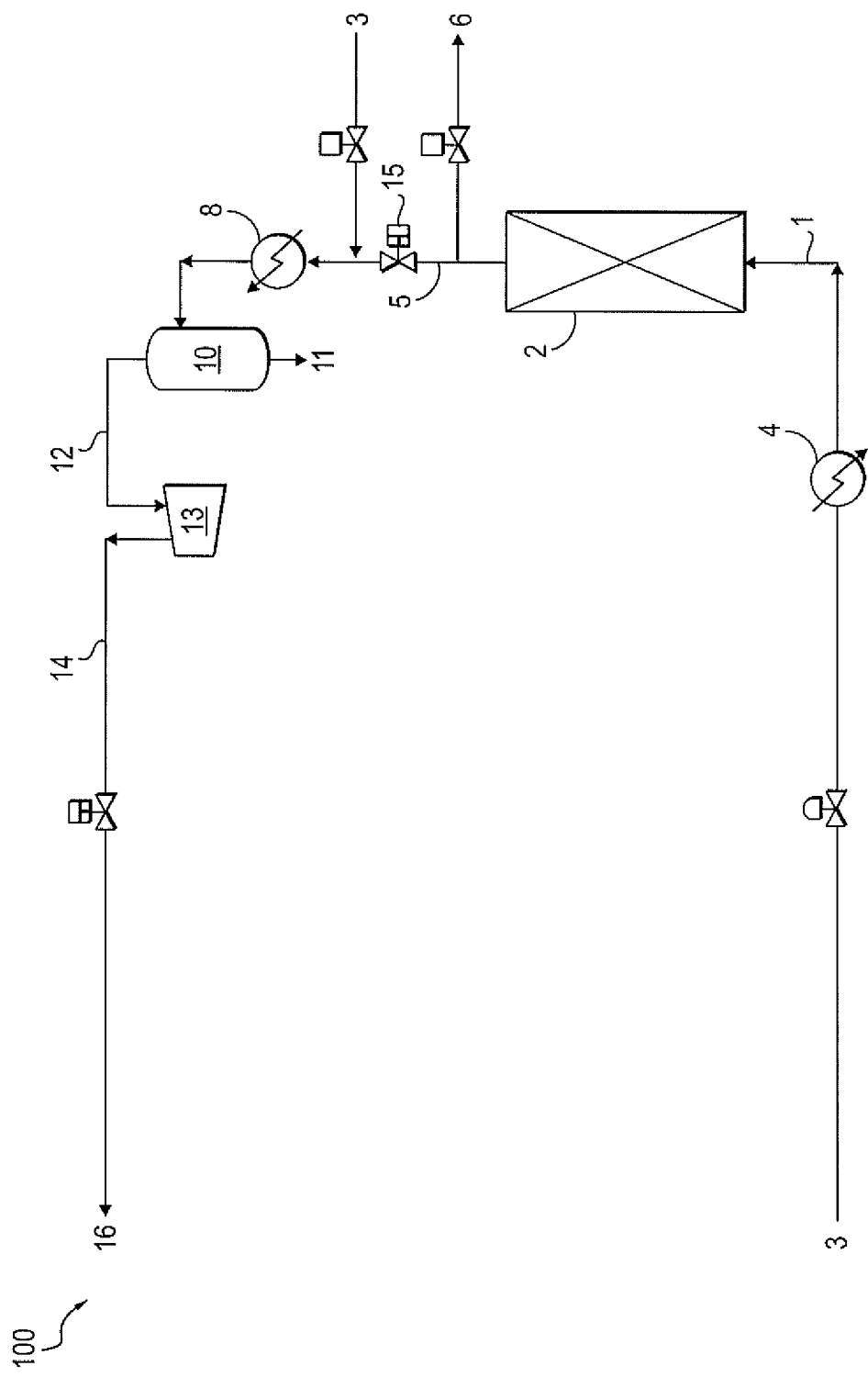
FIGS. 2-3 are schematic diagrams illustrating processes including mercury removal units according to exemplary embodiments.

Referring to FIG. 2, a system 100 and its operation for dehydrating a mercury removal unit in a plant to produce liquefied natural gas, liquefied petroleum gas, and/or cryogenic gas will now be described. The mercury removal unit includes at least two adsorbent bed containing vessels arranged in parallel. Shown is a single mercury removal bed 2 in dehydration mode, as described with respect to FIG. 1. In one embodiment, the spent, wet gas 5 from the mercury removal bed 2 is directed to the condenser 8 rather than to the flare 6, also referred to as "to flare 6." The flow path of gas through the condenser 8, separator 10 and compressor 13 and the flow path of gas through the heater 4 and the mercury removal unit 2 are thus integrated, forming a closed loop for dehydrating mercury removal beds, in which the spent, wet gas 5 is recovered and recycled. Similar to the prior art, the mercury removal bed 2 is dehydrated using dry gas 1 that is sourced from nitrogen or process gas that is then heated. This hot, dry gas 1 flows through the mercury removal bed 2 to desorb water from the adsorbent material. After passing through the mercury removal bed 2 and desorbing water, the spent, wet gas 5 is recovered and recycled, rather than being sent to flare 6. The spent, wet regeneration gas 5 flows through piping from the outlet of the mercury removal bed 2 to the regeneration gas condenser 8, in which the gas 5 is cooled to condense the bulk of the water therein. The condensed water is separated in the regeneration gas knock-out (KO) drum 10, also referred to as the separator 10, and then the gas is compressed by the regeneration gas compressor 13. The compressed gas is recycled back to a location 16 at the front end of the plant, upstream of the primary dehydration unit. After flowing through the front end of the plant and dehydration unit, the dry process gas is again sourced as regeneration gas source 3 and heated using heater 4 to dehydrate the mercury removal bed(s) 2. This heated gas 1 is again flowed through the mercury removal bed(s) 2 to desorb water. The process continues until the mercury removal beds are sufficiently dehydrated. This closed loop process results in significant cost savings and minimizes the environmental impact of flaring.

Figure 3:
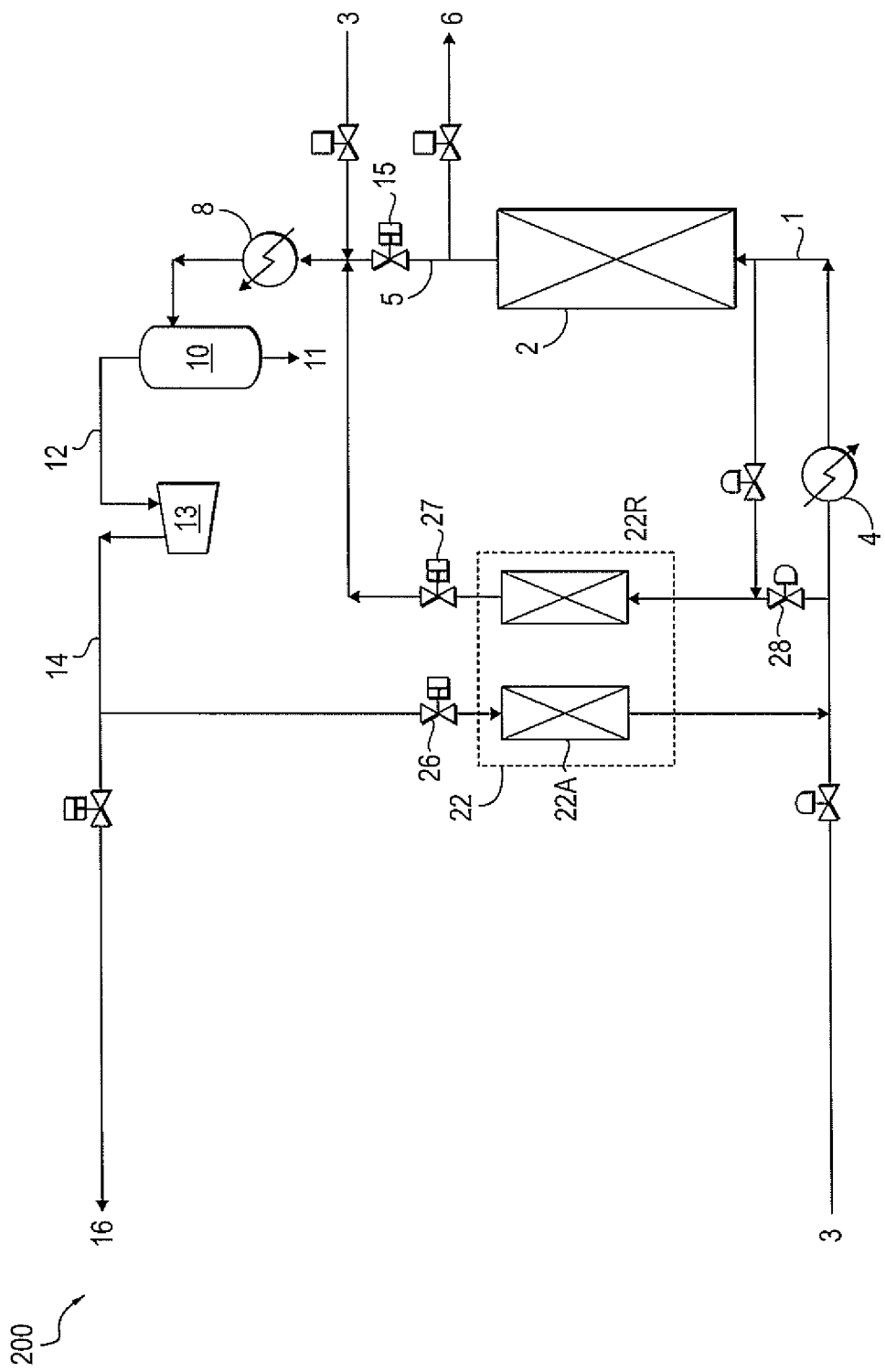

In one embodiment, referring to FIG. 3, an alternative system 200 and its operation for dehydrating a mercury removal unit 2 in a plant to produce liquefied natural gas, liquefied petroleum gas, and/or cryogenic gas will be described. In this embodiment, an independent, closed loop is provided for dehydrating the mercury removal beds, in which the spent, wet regeneration gas 5 is recycled and recovered. As in system 100 shown in FIG. 2, the mercury removal beds 2 are dehydrated using dry gas 1, which is sourced from nitrogen or process gas that is then heated. This hot, dry gas flows through the mercury removal beds to desorb water from the adsorbent material. After passing through the mercury removal beds and desorbing water, the spent, wet gas 5 is recovered and recycled, rather than being sent to the flare 6. The spent, wet regeneration gas 5 flows through piping from the outlet of the mercury removal bed 2 to the regeneration gas condenser 8, in which the gas is cooled to condense the bulk of the water. The condensed water 9 is separated in the regeneration gas KO drum 10, and then the separated gas 12 is compressed by the regeneration gas compressor 13. Rather than recycling the compressed gas to the front end of the plant as in the previously described embodiment, the compressed gas 14 is sent to a secondary molecular sieve dehydration unit 22 for further removing moisture from the regeneration gas stream 14 that includes a pair of vessels 22A and 22B arranged in parallel and containing molecular sieve material. The pair of vessels 22A and 22B alternate between absorption and regeneration modes. At any given time, one of the vessels 22A is in adsorption mode to desorb water from the process gas before it is recycled back to the regeneration gas heater 4 to dehydrate the mercury removal bed 2. The other vessel 22B is in regeneration mode, in which a slip stream of dry process gas is taken from upstream or downstream of the regeneration gas heater 4, depending on whether the vessel is in heating or cooling, respectively. As shown in FIG. 3, vessel 22A is in adsorption mode and vessel 22B is in regeneration mode. Vessel 22A is located in a conduit 23 between the compressor 13 and a location upstream of the heater 4. Vessel 22B is located in a conduit 24 between a location upstream of the heater 4 and a location upstream of the condenser 8. Conduit 25 directs hot, dry process gas to vessel 22R in regeneration mode. After this dry gas flows through the dehydrator vessel 22R, it is tied in with the spent, wet gas 5 from the mercury removal beds 2 upstream of the regeneration gas condenser 8. This provides the further benefit of closed loop operation that is independent of the front end of the plant, e.g., a location 16, including the main dehydration unit.

Dehydration unit 22 is smaller than the main dehydration unit of the plant. This smaller dehydration unit 22 removes residual moisture to ensure the gas is very dry, i.e., having a moisture content below 1 ppm by volume. This dry gas is then heated by the regeneration gas heater 4, and passes back through the mercury removal beds 2. This process continues until the mercury removal beds 2 are sufficiently dehydrated. This closed loop process results in significant cost savings and minimizes the environmental impact of flaring.

Since the gas is not recycled back to the front end of the plant but rather to the secondary dehydration unit 22, certain advantages can be realized. The plant throughput can be increased accordingly, and/or the plant can be designed for lower flow rates thus reducing equipment sizing and capital expense.

The embodiments herein provide a process for recovering nitrogen or process gas that is used for dehydrating mercury removal beds, so the gas need not be flared. The flaring conventionally associated with dehydrating mercury removal beds occurs whenever the beds are reloaded, i.e., after turnaround, or whenever the beds are exposed to moisture breakthrough from upstream dehydration units. The embodiments herein lead to significant costs savings since the nitrogen or process gas does not have to be sourced or purchased, and penalties related to flaring can be avoided.

In one embodiment, a conventionally designed plant to produce liquefied natural gas, liquefied petroleum gas, and/or cryogenic gas can be retrofit to reduce costs and avoid flaring. The prior art system shown in FIG. 1 can be retrofit to the system 100 shown in FIG. 2 by installing a section of conduit indicated by reference numeral 5 to connect the outlet of the mercury removal bed 2 in dehydration mode to an inlet of the regeneration gas condenser 8. A valve 15 can be provided in conduit 5. Optionally, the system can be further retrofit to the system 200 shown in FIG. 3 by installing the molecular sieve dehydration unit 22 and associated piping (23, 24 and 25) and valves (26, 27, 28 and 29).

It should be noted that only the components relevant to the disclosure are shown in the figures, and that many other components normally part of systems using mercury removal units are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an,"

and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A method for dehydrating a mercury removal unit in a plant to produce liquefied natural gas, liquefied petroleum gas, and/or cryogenic gas, the method comprising:
   a) providing a mercury removal vessel containing mercury adsorbing material for removing mercury from a feed gas stream contacting the mercury adsorbing material thereby forming a mercury depleted gas stream to be further processed in the plant, wherein the mercury removal vessel in regeneration mode has a regeneration gas inlet and a regeneration gas outlet, and the mercury removal vessel in adsorption mode has a feed gas inlet and a mercury depleted gas outlet;
   b) contacting the mercury adsorbing material with a regeneration gas stream thereby desorbing water from the mercury adsorbing material within the mercury removal vessel in regeneration mode to form a spent regeneration gas stream;
   c) condensing the spent regeneration gas stream in a condenser to form a stream containing water and gas;
   d) separating the water and the gas from the stream thereby forming a water stream and a regeneration gas stream;
   e) compressing the regeneration gas stream in a compressor;
   f) recycling the regeneration gas stream from the compressor to a location in the plant upstream of an acid gas removal unit or upstream of a regeneration gas dehydration vessel such that the regeneration gas stream is not sent to flare; and
   g) dehydrating the compressed regeneration gas stream in a first dehydration unit comprising a pair of dehydration vessels containing molecular sieve material, wherein the pair of dehydration vessels is arranged in parallel, alternating between absorption and regeneration modes, wherein the dehydration vessel in absorption mode receives gas from a line downstream of the compressor and outputs gas to a line upstream of the mercury removal vessel in regeneration mode, and wherein the dehydration vessel in regeneration mode receives gas from the line upstream of the mercury removal vessel in regeneration mode and outputs gas to a line downstream of the mercury removal vessel in regeneration mode and upstream of the condenser.

2. The method of claim 1 wherein the mercury removal unit comprises two mercury removal vessels arranged in parallel.

3. The method of claim 1 wherein the regeneration gas stream is sourced from a second dehydration unit or a nitrogen gas supply.

4. The method of claim 1 wherein the mercury removal vessel has two ends and each end has an opening that can act as a vessel inlet or a vessel outlet depending on a direction of fluid flow through the mercury removal vessel.

5. The method of claim 1 further comprising continuing steps (b) through (f) until the desorbing of water from the mercury adsorbing material in regeneration mode is sufficiently complete.

6. The method of claim 1 further comprising heating the regeneration gas to a temperature sufficient to desorb water from the mercury adsorbing material prior to step (b).

\* \* \* \* \*